US012508560B2

(12) United States Patent
Bang et al.

(10) Patent No.: US 12,508,560 B2
(45) Date of Patent: Dec. 30, 2025

(54) POWDER TRANSFER SYSTEM

(71) Applicant: LG Energy Solution, Ltd., Seoul (KR)

(72) Inventors: Woong Ju Bang, Daejeon (KR); Jae Pil Koo, Daejeon (KR); Sung Jong Shin, Daejeon (KR); Jae Huoung Son, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/730,198

(22) PCT Filed: May 18, 2023

(86) PCT No.: PCT/KR2023/006720
§ 371 (c)(1),
(2) Date: Jul. 18, 2024

(87) PCT Pub. No.: WO2023/224396
PCT Pub. Date: Nov. 23, 2023

(65) Prior Publication Data

US 2025/0144585 A1 May 8, 2025

(30) Foreign Application Priority Data

May 20, 2022 (KR) ........................ 10-2022-0061721

(51) Int. Cl.
*B01F 35/71* (2022.01)
*B01F 35/221* (2022.01)
*B01F 35/88* (2022.01)

(52) U.S. Cl.
CPC .... *B01F 35/71815* (2022.01); *B01F 35/2211* (2022.01); *B01F 35/71731* (2022.01); *B01F 35/718* (2022.01); *B01F 35/8821* (2022.01)

(58) Field of Classification Search
CPC ................. B65D 88/66; B01F 35/2211; B01F 35/71731; B01F 35/718; B01F 35/71815; B01F 35/8821
See application file for complete search history.

(56) References Cited

U.S. PATENT DOCUMENTS 5,551,297 A 9/1996 Miura et al.
6,425,529 B1 * 7/2002 Reinsch ............ B01F 35/71731 239/69

(Continued)

FOREIGN PATENT DOCUMENTS

CN 107349830 A * 11/2017 ............ B01F 35/881
JP S57182077 A 11/1982

(Continued)

OTHER PUBLICATIONS

International Search Report for PCT/KR2023/006720 mailed on Aug. 25, 2023. 3 pages.

(Continued)

*Primary Examiner* — Timothy L Maust
(74) *Attorney, Agent, or Firm* — Lerner David LLP

(57) ABSTRACT

The powder transfer system includes a transfer pipe, through which powder is transferred, having a plurality of sections along the powder transfer direction, a plurality of sensing units provided for each section of the transfer pipe and provided to detect vibration of the transfer pipe when the powder is transferred for each section, a plurality of vibration units provided to apply vibration to each section of the transfer pipe, and a control part provided to individually control operation of the vibration unit for each section of the transfer pipe based on vibration data obtained from the sensing unit for each section of the transfer pipe.

15 Claims, 3 Drawing Sheets

(56) References Cited

U.S. PATENT DOCUMENTS

| | | | | |
|---|---|---|---|---|
| 10,246,653 | B2 | 4/2019 | Soda et al. | |
| 2022/0161211 | A1 * | 5/2022 | Walter | B01F 35/2211 |

FOREIGN PATENT DOCUMENTS

| | | | |
|---|---|---|---|
| JP | S61118665 | A | 6/1986 |
| JP | H0899718 | A | 4/1996 |
| JP | 2000185824 | A | 7/2000 |
| JP | 2001278449 | A | 10/2001 |
| JP | 2003226427 | A | 8/2003 |
| JP | 2008221116 | A | 9/2008 |
| JP | 2009236383 | A | 10/2009 |
| KR | 960015058 | B1 | 10/1996 |
| KR | 20050091186 | A | 9/2005 |
| KR | 20170020516 | A | 2/2017 |

OTHER PUBLICATIONS

Extended European Search Report including Written Opinion for Application No. 23807915.6 dated Apr. 7, 2025. 7 pages.

* cited by examiner

[Figure 1]
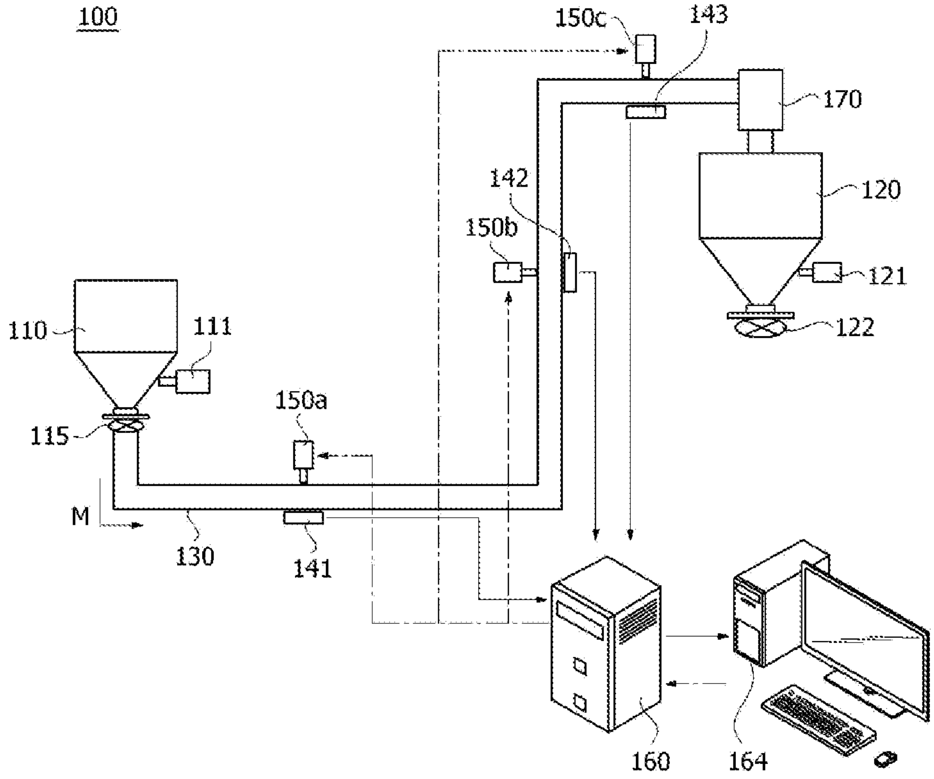

[Figure 2]
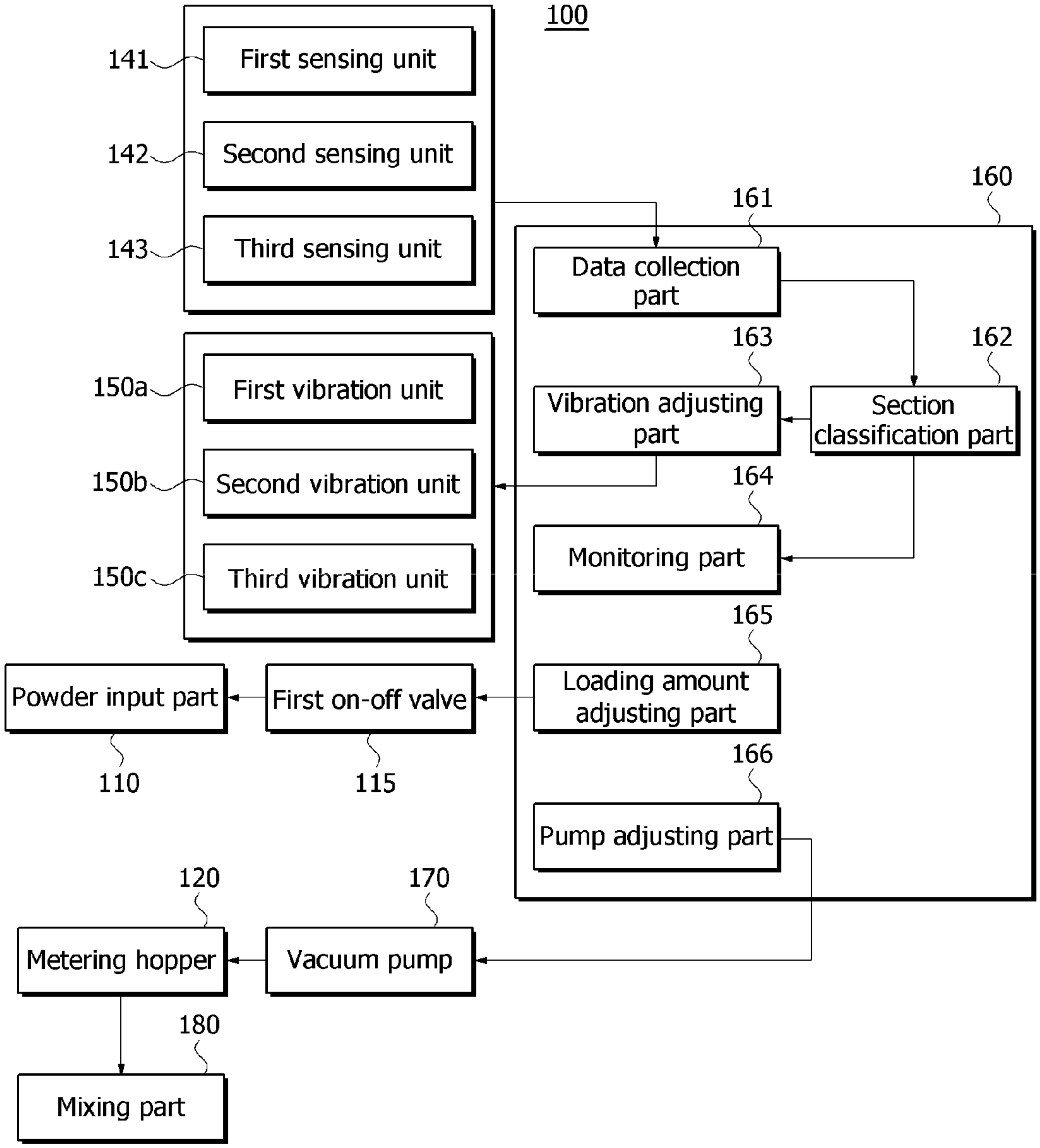
[Figure 3]
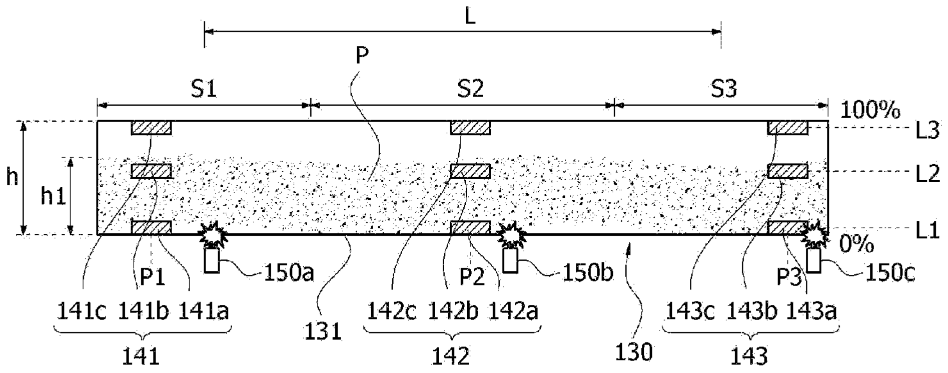

[Figure 4]
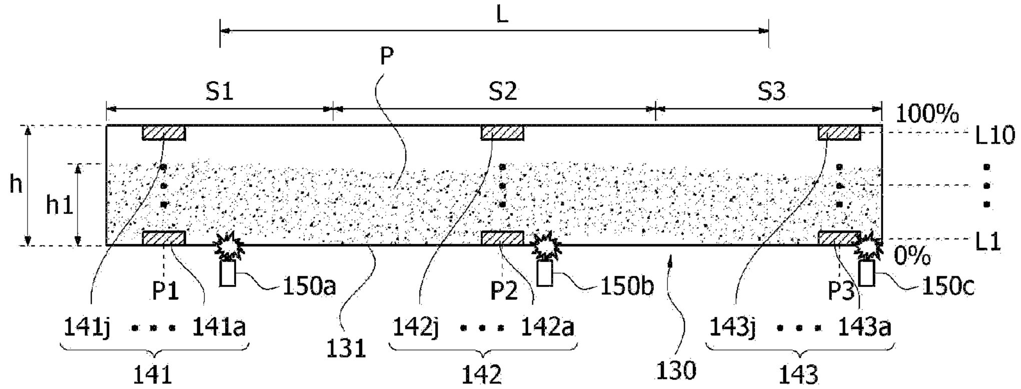
[Figure 5]
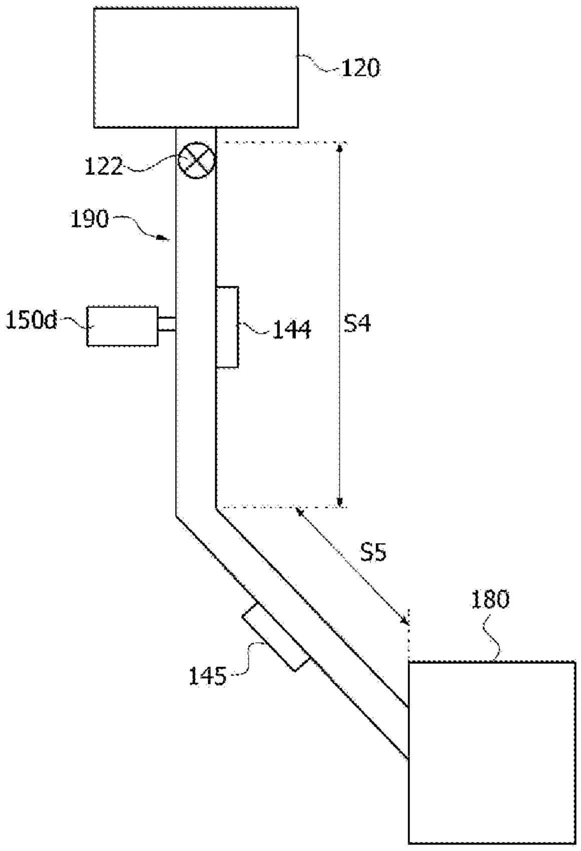

POWDER TRANSFER SYSTEM

CROSS-REFERENCE TO RELATED APPLICATIONS

The present application is a national phase entry under 35 U.S.C. § 371 of International Application No. PCT/KR2023/006720, filed May 18, 2023, published in Korean, which claims priority from Korean Patent Application No. 10-2022-0061721 dated May 20, 2022, the disclosures of which are incorporated herein by reference in their entireties.

FIELD OF THE INVENTION

The present invention relates to a powder transfer system and a powder transfer method, and specifically, relates to a powder transfer system and a powder transfer method capable of preventing clogging of a transfer pipe by powder by monitoring a transfer state of powder and applying vibration to the transfer pipe in an abnormal section.

BACKGROUND OF THE INVENTION

Processes for manufacturing an electrode of a secondary battery are divided into a slurry manufacturing process, a process of coating a slurry on a current collector, a rolling process, a slitting process, and a drying process.

The slurry is a mixture of an active material, a conductive material, a binder, and a solvent. The active material and the conductive material are dry-mixed in powder forms. Thereafter, the active material and the conductive material are wet-mixed in the solvent in which the binder is dissolved to form the slurry.

Various active materials are used according to the product type of the secondary battery, where it has each of different characteristics depending on the type of the active material. Depending on the type of active material, there are differences in the time when the respective raw materials are introduced into a mixing device, the time when the respective raw materials are mixed in a mixing device, and the like. Accordingly, there has been a problem that in the active material taking a long time for introduction to the mixing device, productivity is lowered.

Meanwhile, if the active material is agglomerated in the pipe when the active material is transferred, the transfer time varies, so that it is necessary to disperse the agglomerated active material by monitoring this and confirming the location of the agglomerated active material.

BRIEF SUMMARY OF THE INVENTION

The present invention is intended to provide a powder transfer system and a powder transfer method capable of preventing clogging of a transfer pipe by the powder by monitoring the transfer of the powder used in the slurry manufacturing process and applying vibration to the transfer pipe in an abnormal section.

In order to solve the above-described technical problem, a powder transfer system related to one example of the present invention comprises a transfer pipe, through which powder is transferred, having a plurality of sections along the powder transfer direction, a plurality of sensing units provided for each section of the transfer pipe and provided to detect vibration of the transfer pipe when the powder is transferred for each section, a plurality of vibration units provided to apply vibration to each section of the transfer pipe, and a control part provided to individually control operation of the vibration unit for each section based on vibration data obtained from the sensing unit for each section of the transfer pipe.

Also, the control part may be provided to control the operation of the vibration unit for each section of the transfer pipe based on a result of comparing the vibration data obtained from the sensing unit for each section of the transfer pipe and the normal vibration data for each section stored in advance.

In addition, the sensing unit may comprise a plurality of vibration sensors disposed apart from each other along a loading height direction of the powder for each section of the transfer pipe when the powder is transferred.

Furthermore, the plurality of vibration sensors may be provided at different heights, respectively, based on the bottom surface of the transfer pipe.

Also, the control part may be provided to control the operation of the vibration unit provided in the relevant section based on a result of comparing the vibration data obtained from the plurality of vibration sensors in the section and the normal vibration data for each height stored in advance.

In addition, the control part may be provided so that the loading height of the powder under transfer is calculated based on vibration data obtained from the plurality of vibration sensors provided along the loading height direction of the powder in the relevant section of the transfer pipe, and the operation of the vibration unit is controlled according to the calculated height.

Furthermore, the control part may be provided to adjust a vibration intensity of the vibration unit based on the difference between the calculated powder loading height and the preset normal loading height.

Also, the control part may be provided to increase the vibration intensity of the vibration unit in proportion to the difference between the calculated powder loading height and the preset normal loading height.

In addition, the normal loading height may be a height within a range of 50% (0.5 h) to 70% (0.7 h) of the total height (h) based on the bottom surface of the transfer pipe.

Furthermore, the system may further comprise a monitoring part displaying loading height information of the powder under transfer for each section of the transfer pipe.

Also, the vibration unit may be an ultrasonic vibration vibrator.

In addition, the system may further comprise a powder input part supplying the powder to the transfer pipe, a metering hopper accommodating the powder transferred along the transfer pipe, and a vacuum pump provided between the metering hopper and the transfer pipe and applying a vacuum pressure to the transfer pipe so that the powder is transferred to the metering hopper along the transfer pipe.

Furthermore, the control part may be provided to adjust the transfer speed of the powder by adjusting the strength of the vacuum pressure of the vacuum pump.

Also, the system may further comprise a first on-off valve provided between the powder input part and the transfer pipe, and the control part may adjust the input amount of the powder supplied to the transfer pipe by controlling the first on-off valve.

In addition, the system may further comprise a supply pipe into which the powder measured in the metering hopper is introduced, and a mixing part connected to the supply pipe.

Furthermore, the supply pipe may have a plurality of sections along the transfer direction of the powder toward the mixing part.

Also, the system may further comprise a plurality of sensing units provided for each section of the supply pipe, and provided to detect vibration of the supply pipe upon powder transfer for each section, and a vibration unit provided to apply vibration to a section adjacent to the metering hopper among the plurality of sections.

In addition, the control part may be provided to control the operation of the vibration unit of the supply pipe based on the vibration data obtained for each section in the supply pipe.

As described above, the powder transfer system related to one example of the present invention has the following effects.

It is possible to monitor the powder transfer state based on the vibration data obtained from the transfer pipe during powder transfer and the preset normal vibration data, and it is possible to apply vibration to the region of the transfer pipe determined to be an abnormal section.

Also, by individually applying vibration to each region of the transfer pipe or adjusting the intensity of vibration, it is possible to prevent the powder from clogging the transfer pipe, and it is possible to smoothly transfer the powder.

In addition, it is possible to improve the efficiency of the slurry preparing process by improving the powder transfer efficiency in the slurry manufacturing process.

BRIEF DESCRIPTION OF THE DRAWINGS

FIG. 1 is a schematic diagram showing a powder transfer system according to one example of the present invention.

FIG. 2 is a configuration diagram schematically showing a powder transfer system according to one example of the present invention.

FIGS. 3 and 4 show an operating state of the powder transfer system when the powder is transferred along the transfer pipe shown in FIG. 1.

FIG. 5 is a schematic diagram showing a metering hopper and a mixing part of a powder transfer system.

DETAILED DESCRIPTION

Hereinafter, a powder transfer system according to one example of the present invention will be described in detail with reference to the accompanying drawings.

In addition, regardless of the reference numerals, the same or corresponding components are given by the same or similar reference numerals, duplicate descriptions thereof will be omitted, and for convenience of explanation, the size and shape of each component member as shown can be exaggerated or reduced.

FIG. 1 is a schematic diagram showing a powder transfer system (100) according to one example of the present invention.

Referring to FIG. 1, the powder transfer system (100) comprises a transfer pipe (130), through which powder is transferred, having a plurality of sections along the powder transfer direction (M), a plurality of sensing units (141, 142, 143) provided for each section of the transfer pipe (130) and provided to detect vibration of the transfer pipe when the powder is transferred for each section, a plurality of vibration units (150*a*, 150*b*, 150*c*) provided to apply vibration to each section of the transfer pipe (130), and a control part 160 provided to individually control operation of the vibration unit (150*a* 150*b*, 150*c*) for each section of the transfer pipe (130) based on vibration data obtained from the sensing units (141, 142, 143) for each section of the transfer pipe (130).

FIG. 2 is a configuration diagram schematically showing a powder transfer system (100) according to one example of the present invention, and FIGS. 3 and 4 show an operating state of the powder transfer system when the powder (P) is transferred along the transfer pipe (130) shown in FIG. 1.

In addition, the powder transfer system (100) may comprise a powder input part (110) supplying the powder to the transfer pipe (130), a metering hopper (120) accommodating the powder transferred along the transfer pipe (130), and a vacuum pump (170) provided between the metering hopper (120) and the transfer pipe (130) and applying a vacuum pressure to the transfer pipe (130) so that the powder is transferred to the metering hopper (120) along the transfer pipe (130). Furthermore, the control part (160) may be provided to adjust the transfer speed of the powder by adjusting the strength of the vacuum pressure of the vacuum pump (170).

Referring to FIG. 1, the powder transfer system (100) related to one example of the present invention may comprise a powder input part (110), a metering hopper (120), a transfer pipe (130), and sensing units (141, 142, 143), vibration units (150*a*, 150*b*, 150*c*), a control part (160), and a vacuum pump (170). In addition, the system (100) may comprise a first on-off valve (115) provided between the powder input part (110) and the transfer pipe (130).

The transfer pipe (130) connects the powder input part (110) and the metering hopper (120). The transfer pipe (130) is a pipe through which the powder (P) is transferred from the powder input part (110) to the metering hopper (120). The plurality of sensing units (141, 142, 143) and the plurality of vibration units (150*a*, 150*b*, 150*c*) are installed in the transfer pipe (130).

The transfer pipe (130) may have a plurality of sections (S1, S2, S3) along the powder transfer direction (M), and the sensing units (141, 142, 143) and the vibration units (150*a*, 150*b*, 150*c*) may be provided in the transfer pipe (130) for each preset section (S1, S2, S3) in the longitudinal direction (L) of the transfer pipe (130). In such a structure, according to one example of the present invention, it is possible to monitor the transfer state of the powder (P) for each section by dividing the transfer pipe (130) into a plurality of sections.

The number of sections in the transfer pipe (130) may be variously set in consideration of the length of the transfer pipe (P) and characteristics of the active material, and the like. For convenience of explanation, in this example, the transfer pipe (130) may be divided into three sections (S1, S2, S3) along the longitudinal direction (L) of the transfer pipe (130), and each section (S1, S2, S3) may be referred to as a first section (S1) to a third section (S3) along the powder transfer direction (M).

Here, the first section (S1) may be a section adjacent to the powder input part (110), and the third section (S3) may be a section adjacent to the metering hopper (120). Also, the second section (S2) may be a section between the first section (S1) and the third section (S3).

For convenience of explanation, in this document, the sensing unit and the vibration unit installed in the first section (S1) of the transfer pipe (130) may be referred to as a first sensing unit (141) and a first vibration unit (150*a*). Similarly, the sensing unit and the vibration unit installed in the second section (S2) of the transfer pipe (130) may be referred to as a second sensing unit (142) and a second vibration unit (150*b*), and the sensing unit and the vibration unit installed in the third section (S3) of the transfer pipe (130) may be referred to as a third sensing unit (143) and a third vibration unit (150*c*).

The first sensing unit (141) is provided in the first section (S1) and detects the transfer state of the powder (P) passing through the first section (S1). Also, the second sensing unit (142) is provided in the second section (S2) and detects the transfer state of the powder passing through the second section (S2). In addition, the third sensing unit (143) is provided in the third section (S3) and detects the transfer state of the powder passing through the third section (S3). Furthermore, each of the sensing units (141 to 143) may comprise one or more vibration sensors for detecting vibration of the transfer pipe at installation locations. The first sensing unit (141) to the third sensing unit (143) provide respective sensing data (vibration data) to the control part (160). That is, each of the sensing units (141 to 143) detects vibration data for each position at the installed position when the powder is transferred. In particular, compared to a liquid slurry, in the case of the powder (active material), it may be advantageous to detect it through the vibration sensor, and it is possible to eliminate agglomeration of the powder by physical impacts of a vibrator.

In such a structure, the control part (160) may be provided to control the operation of the vibration unit for each section of the transfer pipe (130) based on a result of comparing the vibration data obtained from the sensing units (141 to 143) for each section (S1, S2, S3) of the transfer pipe (130) and the normal vibration data for each section (S1, S2, S3) stored in advance.

As one example, the vibration unit may be an ultrasonic vibration vibrator.

The control part (160) may determine each section as a "normal section" or an "abnormal section" by comparing the vibration data obtained from the sensing unit for each section and the preset normal vibration data, and may operate the vibration unit installed in the abnormal section.

For example, the control part (160) may compare the vibration data obtained from the sensing units (141 to 143) for each section (S1, S2, S3) and the normal vibration data for each section (S1, S2, and S3) stored in advance to determine the relevant section as the normal section when it is determined to be in the normal range. At this time, it does not operate the vibration unit provided in the normal section. Unlike this, the control part (160) may compare the vibration data obtained from the sensing units (141 to 143) for each section (S1, S2, S3) and the normal vibration data for each section (S1, S2, and S3) stored in advance to determine the relevant section as the abnormal section when it is determined to be in the abnormal range. At this time, it operates the vibration unit provided in the abnormal section, and the vibration is applied to the relevant section by the vibration unit.

Also, when the powder (P) is transferred, the sensing unit (141 to 143) may comprise a plurality of vibration sensors disposed apart from each other along the loading height direction (h) of the powder for each section of the transfer pipe (130). At this time, the plurality of vibration sensors may be provided at different heights, respectively, based on the bottom surface (131) of the transfer pipe (130).

In addition, the control part (160) may be provided to control the operation of the vibration unit provided in the relevant section based on a result of comparing the vibration data obtained from the plurality of vibration sensors in the section and the normal vibration data for each height stored in advance. That is, it may operate only the vibration unit of the section determined to be within the abnormal range without operating the vibration unit of the section determined to be within the normal range.

Furthermore, the control part may be provided so that the loading height (h1) of the powder under transfer is calculated based on vibration data obtained from the plurality of vibration sensors provided along the loading height direction (h) of the powder in the relevant section of the transfer pipe, and the operation of the vibration unit is controlled according to the calculated height.

In addition, the control part (160) may be provided to adjust a vibration intensity of the vibration unit based on the difference between the calculated powder loading height (h1) and the preset normal loading height. That is, the control part (160) may operate the vibration unit when the calculated powder loading height (h1) is greater than the preset normal loading height, and the higher the difference between the calculated powder loading height (h1) and the preset normal loading height, the control part (160) may further increase the intensity of vibration of the vibration unit.

As one example, the control part (160) may be provided to increase the vibration intensity of the vibration unit in proportion to the difference between the calculated powder loading height and the preset normal loading height.

As one example, the normal loading height may be a height within a range of 50% (0.5 h) to 70% (0.7 h) of the total height (h) based on the bottom surface (131) of the transfer pipe (130).

Hereinafter, referring to FIG. 3, a case in which the transfer pipe (130) is divided into three sections (S1, S2, S3), and three vibration sensors are provided for each section along the loading height direction (h) of the powder (P) will be explained as an example.

Referring to FIG. 3, in order to determine the normal section and the abnormal section, in the loading height direction (h) of the powder (P) transferred along the transfer pipe (130), a plurality of levels having different relative heights with respect to the bottom surface (131) of the transfer pipe (130) may be preset, and each sensing unit may comprise a plurality of vibration sensors provided at positions corresponding to the respective levels.

That is, each of the sensing units (141, 142, 143) comprises a plurality of sensors (vibration sensors) installed apart from each other along the loading height direction (h) of the powder in the transfer pipe (130) to correspond to each level.

For convenience of explanation, the plurality of vibration sensors of the first sensing unit (141) provided in the first section (S1) are referred to as first sensors (141*a* to 141*c*), the plurality of vibration sensors of the second sensing unit (142) provided in the second section (S2) are referred to as second sensors (142*a* to 142*c*), and the plurality of vibration sensors of the third sensing unit (143) provided in the third section (S3) are referred to as third sensors (143*a* to 143*c*).

However, the first sensing unit (141) to the third sensing unit (143) are different only in installation positions, but have the same configuration and function, whereby in order to avoid repeating the explanation, the first sensing unit (141) will be explained as an example.

Referring to FIG. 3, within the first section, the plurality of first sensors (141*a* to 141*c*) are disposed apart from each other up and down along the loading height direction (h) of the powder in the transfer pipe. The first sensors (141*a* to 141*c*) may be installed on the outer surface of the transfer pipe (130). The first sensors (141*a* to 141*c*) detect the vibration of the transfer pipe (130) when the powder is transferred.

First of all, the plurality of first sensors (141*a* to 141*c*) may be installed at a first position (P1), which is an arbitrary position in the first section (S1). The plurality of first sensors (141*a* to 141*c*) may be divided into a la sensor (141*a*) to a 1c sensor (141*c*) according to the installation heights.

Here, the 1a sensor (141*a*) may be provided toward the bottom surface of the transfer pipe (130). In addition, the 1b sensor (141*b*) may be provided at an intermediate position of the transfer pipe (130) along the loading height direction (h) of the powder in the transfer pipe (130). Then, the 1c sensor (141*c*) may be provided at a height farthest from the bottom surface of the transfer pipe (130) along the loading height direction (h) of the powder in (130). The distances between the respective sensors may be freely adjusted.

In addition, the plurality of second sensors (142*a* to 142*c*) may be installed at a second position (P2), which is an arbitrary position in the second section (S2). The plurality of second sensors (142*a* to 142*c*) may be divided into a 2a sensor (142*a*) to a 2c sensor (142*c*) according to the installation heights.

Similarly, the plurality of third sensors (143*a* to 143*c*) may be installed at a third position (P3), which is an arbitrary position in the third section (S3). The plurality of third sensors (143*a* to 143*c*) may be divided into a 3a sensor (143*a*) to a 3c sensor (143*c*) according to the installation heights.

The 1a sensor (141*a*), the 2a sensor (142*a*), and the 3a sensor (143*a*) may be provided at positions toward the bottom surface of the transfer pipe (130), respectively, and may be disposed apart from each other in the longitudinal direction (L) of the transfer pipe (130). Also, the 1b sensor (141*b*), the 2b sensor (142*b*), and the 3b sensor (143*b*) may be provided at intermediate positions along the loading height direction (h) of the powder in the transfer pipe (130), respectively, and may be disposed apart from each other in the longitudinal direction (L) of the transfer pipe (130). In addition, the 1c sensor (141*c*), the 2c sensor (142*c*), and the 3c sensor (143*c*) may be provided at positions farthest from the bottom surface of the transfer pipe (130) along the loading height direction (h) of the powder in the transfer pipe (130), respectively, and may be disposed apart from each other in the longitudinal direction (L) of the transfer pipe.

The first vibration unit (150*a*) may be installed adjacent to the first sensing unit (141) in the first section (S1). The first vibration unit (150*a*) provides vibration to the first section (S1) of the transfer pipe (130).

Also, the second vibration unit (150*b*) may be installed adjacent to the second sensing unit (142) in the second section (S2). The second vibration unit (150*b*) provides vibration to the second section (S2) of the transfer pipe (130).

In addition, the third vibration unit (150*c*) may be installed adjacent to the third sensing unit (143) in the third section (S3). The third vibration unit (150*c*) provides vibration to the third section (S3) of the transfer pipe (130).

The first vibration unit (150*a*) to the third vibration unit (150*c*) are different only in installation positions, but have the same configuration and function, and as the first vibration unit (150*a*) to the third vibration unit (150*c*), various types of vibrators may be used.

Referring to FIG. 2, the control part (160) may comprise a data collection part (161) for collecting vibration data of the sensing unit, upon powder transfer, a section classification part (162) for classifying a normal section and an abnormal section for each section of the transfer pipe (130), a monitoring part (164) displaying loading height information of the powder under transfer for each section of the transfer pipe (130), a loading amount adjusting part (165), and a pump adjusting part (166).

The operations of the first vibration unit (150*a*) to the third vibration unit (150*c*) may be individually controlled by a vibration adjusting part (163). Then, the first vibration unit (150*a*) to the third vibration unit (150*c*) are provided so that the vibration intensity may be adjusted by the vibration adjusting part (163).

In addition, the control part (160) may determine and classify each section as a "normal section" or "abnormal section" according to the transfer state of the powder based on the preset normal vibration data and the vibration data obtained from the sensing unit, and may individually control the operation of the vibration unit installed in the abnormal section.

Referring to FIG. 3, as one example, the plurality of levels may be set along the loading height direction of the powder in the transfer pipe (130), and may be set by dividing them the "normal level" and "abnormal level" based on the loading height (h1) of the powder to the total height (h).

The normal level (L2) may be defined as a relative height (h1/h) within the range of 0.5 h to 0.7 h of the total height (h) of the transfer pipe (130). The abnormal level (L3, see FIG. 3) may be a level having a height exceeding the relative height. The reference level (L1, see FIG. 3) may correspond to the height of the bottom surface of the transfer pipe (130).

Here, the reference level may be set to Level 1 (L1), and the 1a sensor (141*a*) to the 3a sensor (143*a*) may be provided to detect the vibration of the transfer pipe (130) at a position corresponding to Level 1, which is the reference level.

The normal level may be set to Level 2 (L2), and the 1b sensor (141*b*) to the 3b sensor (143*b*) may be provided to detect the vibration of the transfer pipe (130) at a position corresponding to Level 2 (L2).

In addition, the abnormal level may be set to Level 3 (L3), which corresponds to a position where the relative height of the transfer pipe (130) to the bottom surface (131) is higher than that of Level 2 (L2). The 1c sensor (141*c*) to the 3c sensor (143*c*) may be provided to detect the vibration of the transfer pipe (130) at a position corresponding to Level 3 (L3).

In another example, referring to FIG. 4, 10 sensors (141*a* to 141*j*, 142*a* to 142*j*, 143*a* to 143*j*) may be disposed apart from each other in the loading height direction (h) of the powder (P) based on the bottom surface (131) of the transfer pipe (130), and the plurality of levels may be divided into Level 1 (L1) to Level 10 (L10). FIG. 4 is an example of subdividing level units into 10, where the operation method of the powder transfer system (100) is the same as that of FIG. 3.

Referring to FIG. 4, the plurality of levels may be subdivided into 10 levels, and the relative height of 0.5 h to the total height (h) may be set to the control part (160) as the normal level. In this case, the normal level range may be set to Level 1 (L1) to Level 5 (L5), and the abnormal level range may be set to Level 6 (L6) to Level 10 (L10).

On the basis of the detected vibration data, the control part (160) may calculate the level as a ratio (h1/h) of the powder loading height (h1) to the bottom surface (131) based on the total height (h) of the transfer pipe (130) for each section (S1 to S3). Then, when the calculated level is determined to be the abnormal level, the control part (160) may classify the relevant section as the abnormal section, and may operate any one vibration unit installed in the abnormal section. Also, the control part (160) may adjust the vibration intensity while operating the vibration unit.

Referring to FIG. 2, the data collection part (161) collects vibration data sensed by each sensor for each section (S1, S2, S3) of the transfer pipe (130).

The section classification part (162) performs a function of receiving vibration data from the data collection part (161) to classify a normal section and an abnormal section for each section (S1 to S3) based on the vibration data.

Also, the vibration adjusting part (163) performs a function of individually controlling each vibration unit to apply vibration to an abnormal section based on the classification information of the section classification part (162). The vibration adjusting part (163) may control the vibration unit so that the vibration intensity increases as the powder loading height is higher than the normal loading height.

In addition, the monitoring part (164) performs a function of dividing the powder transfer state information into "normal" and "abnormal" in the longitudinal direction (L) of the transfer pipe (130) based on the information classified by the section classification part (162) to display it. Accordingly, through the monitoring part (164), it is possible to monitor the powder transfer state in real time.

Meanwhile, the powder input part (110) is installed on one side of the transfer pipe (130) to supply the powder to the transfer pipe (130). The powder input part (110) comprises a hopper. A vibrating member (111) may be installed in the powder input part (110). The vibrating member (111) is provided to apply the vibration to the powder input part (110), and accordingly, it is possible to prevent a phenomenon that the powder is agglomerated on the inner surface of the powder input part (110).

Also, a first on-off valve (115) is provided at the outlet of the powder input part (110). The opening and closing operation of the first on-off valve (115) is controlled by the control part (160). The control part (160) may control the input amount of the powder supplied to the transfer pipe (130) by controlling the first on-off valve (115). Specifically, the control part (160) may adjust the input amount of the powder input into the transfer pipe (130) by adjusting the opening and closing of the first on-off valve (115) installed in the powder input part (110) through the loading amount adjusting part (165).

In addition, a metering hopper (120) is installed on the other side of the transfer pipe (130), and the powder transferred along the transfer pipe (130) is accommodated therein. In addition, a vibrating member (121) is installed in the metering hopper (120).

Furthermore, a vacuum pump (170) is installed between the metering hopper (120) and the transfer pipe (130). The operation of the vacuum pump (170) is controlled by a pump adjusting part (166). The vacuum pump (170) applies a vacuum pressure to the transfer pipe (130) to operate so that the powder is transferred from the powder input part (110) to the metering hopper (120) along the transfer pipe (130).

FIG. 5 is a schematic diagram showing the metering hopper (120) and the mixing part (180) of the powder transfer system.

In addition, the metering hopper (120) is connected to the mixing part (180) via a supply pipe (190). The vibrating member (121) applying the vibration to the metering hopper (120) may be installed at the outlet side of the metering hopper (120). The metering hopper (120) measures the powder in a volume preset in the control part (160) to supply it to the mixing part (180) where raw materials constituting the slurry are mixed.

Referring to FIG. 5, the system (100) may comprise the supply pipe (190) into which the powder measured in the metering hopper (120) is introduced, and the mixing part (180) connected to the supply pipe (190).

Also, the supply pipe (190) may have a plurality of sections (S4, S5) along the transfer direction of the powder toward the mixing part (180).

In addition, the system (100) may comprise a plurality of sensing units (144, 145) provided for each section (S4, S5) of the supply pipe (190), and provided to detect vibration of the supply pipe (190) upon powder transfer for each section (S4, S5), and a vibration unit (**150*d*) provided to apply vibration to a section (S4) adjacent to the metering hopper (120) among the plurality of sections (S4, S5**).

Furthermore, the control part (160) may be provided to control the operation of the vibration unit (**150*d*) of the supply pipe (190) based on the vibration data obtained for each section in the supply pipe (190**).

In addition, a second on-off valve (122) is provided on the outlet side of the metering hopper (120). The opening and closing operation of the second on-off valve (122) is controlled by the control part (160). The control part (160) may adjust the input amount of the powder supplied to the supply pipe (190) by controlling the second on-off valve (122).

The preferred examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

According to the powder transfer system related to one example of the present invention, it is possible to monitor the transfer state of the powder based on the vibration data obtained from the transfer pipe during powder transfer and the preset normal vibration data, and it is possible to apply the vibration to the region of the transfer pipe determined to be the abnormal section.

The invention claimed is:

1. A powder transfer system comprising:

a transfer pipe, through which powder is transferred, having a plurality of sections along the powder transfer direction;

a plurality of sensing units provided for each section of the transfer pipe and provided to detect vibration of the transfer pipe when the powder is transferred for each section;

a plurality of vibration units configured to apply vibration to each section of the transfer pipe; and a control part configured to individually control operation of the vibration unit for each section of the transfer pipe based on vibration data obtained from the sensing unit for each section of the transfer pipe, wherein the plurality of sensing units comprises a plurality of vibration sensors disposed apart from each other along a loading height direction of the powder for each section of the transfer pipe when the powder is transferred.

2. The powder transfer system according to claim 1, wherein the control part is configured to control an operation of the vibration unit for each section of the transfer pipe based on a result of comparing the vibration data obtained from the sensing unit for each section and the normal vibration data for each section stored in advance.

3. The powder transfer system according to claim 2, wherein the plurality of vibration sensors is provided at different heights, respectively, based on the bottom surface of the transfer pipe, and the control part is configured to control the operation of the vibration unit provided in the relevant section based on a result of comparing the vibration data obtained from the plurality of vibration sensors in the section and the normal vibration data for each height stored in advance.

4. The powder transfer system according to claim 3, wherein the control part is configured so that the loading height of the powder under transfer is calculated based on vibration data obtained from the plurality of vibration sensors provided along the loading height direction of the powder in the relevant section, and the operation of the vibration unit is controlled according to the calculated height.

5. The powder transfer system according to claim 4, wherein the control part is configured to adjust a vibration intensity of the vibration unit based on the difference between the calculated powder loading height and the preset normal loading height.

6. The powder transfer system according to claim 5, wherein the control part is configured to increase the vibration intensity of the vibration unit in proportion to the difference between the calculated powder loading height and the preset normal loading height.

7. The powder transfer system according to claim 6, wherein the normal loading height is a height within a range of 50% (0.5*h*) to 70% (0.7*h*) of the total height (h) based on the bottom surface of the transfer pipe.

8. The powder transfer system according to claim 4, further comprising a monitoring part for displaying loading height information of the powder under transfer for each section of the transfer pipe.

9. The powder transfer system according to claim 1, wherein the vibration unit is an ultrasonic vibration vibrator.

10. The powder transfer system according to claim 1, further comprising:

a powder input part supplying the powder to the transfer pipe;

a metering hopper accommodating the powder transferred along the transfer pipe; and a vacuum pump provided between the metering hopper and the transfer pipe and configured for applying a vacuum pressure to the transfer pipe so that the powder is transferred to the metering hopper along the transfer pipe.

11. The powder transfer system according to claim 10, wherein the control part is configured to adjust the transfer speed of the powder by adjusting the strength of the vacuum pressure of the vacuum pump.

12. The powder transfer system according to claim 10, further comprising a first on-off valve provided between the powder input part and the transfer pipe, wherein the control part is configured to adjust the input amount of the powder supplied to the transfer pipe by controlling the first on-off valve.

13. The powder transfer system according to claim 10, further comprising a supply pipe into which the powder measured in the metering hopper is introduced; and a mixing part connected to the supply pipe, wherein the supply pipe has a plurality of sections along the transfer direction of the powder toward the mixing part.

14. The powder transfer system according to claim 13, further comprising:

a plurality of sensing units provided for each section of the supply pipe, and provided to detect vibration of the supply pipe upon powder transfer for each section; and a vibration unit configured to apply vibration to a section adjacent to the metering hopper among the plurality of sections.

15. The powder transfer system according to claim 14, wherein the control part is configured to control the operation of the vibration unit of the supply pipe based on the vibration data obtained for each section in the supply pipe.

* * * * *